(12) United States Patent
Petrovic

(10) Patent No.: US 8,792,565 B2
(45) Date of Patent: Jul. 29, 2014

(54) 10 GBPS COAXIAL CABLE NETWORKING SYSTEM

(75) Inventor: Branislav Petrovic, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 245 days.

(21) Appl. No.: 13/325,418

(22) Filed: Dec. 14, 2011

(65) Prior Publication Data

US 2013/0156115 A1    Jun. 20, 2013

(51) Int. Cl.
*H04B 3/00*    (2006.01)

(52) U.S. Cl.
USPC .......................................................... 375/257

(58) Field of Classification Search
USPC ................... 375/222, 257, 377; 725/78, 127; 370/254
See application file for complete search history.

(56) References Cited

U.S. PATENT DOCUMENTS

| | | | |
|---|---|---|---|
| 8,296,817 B2 * | 10/2012 | Fifield et al. | 725/127 |
| 8,443,406 B2 * | 5/2013 | Reed et al. | 725/78 |
| 2005/0083856 A1 * | 4/2005 | Morelli et al. | 370/254 |
| 2007/0249203 A1 * | 10/2007 | Snawerdt | 439/171 |
| 2008/0178252 A1 * | 7/2008 | Michaud | 726/1 |
| 2009/0022067 A1 * | 1/2009 | Gotwals | 370/254 |
| 2009/0235322 A1 * | 9/2009 | Krein et al. | 725/127 |

* cited by examiner

*Primary Examiner* — Khanh C Tran
(74) *Attorney, Agent, or Firm* — Richard Bachand; Bruce Greenhaus

(57) ABSTRACT

Systems and methods are described for providing a throughput of 10 Gbps or more in a coaxial cable network and which operate at high frequencies above the existing services on home coax in the range 2 GHz to 10 GHz, or more. The network uses a wide signal bandwidth, in the range, for example, of 8 GHz. Operating above the CATV band and satellite services, the network coexists with these services without mutual interference. The system could be used in networking systems, such as MoCA 3 and Access systems. This is achieved by using a splitter with a low loss and low isolation in the 2-10 GHz range at the point-of entry (POE) of the network signal. Alternatively, an active node to provide a signal booster or a repeater function at the point-of-entry (POE) can be used.

28 Claims, 10 Drawing Sheets

10 GBPS COAXIAL CABLE NETWORKING SYSTEM

FIELD

The methods, circuits, devices, apparatuses, and systems described herein relate to improvements in signal distribution systems, and more particularly to methods, and apparatuses used, for example, in coaxial cable signal distribution networks and systems.

BACKGROUND

Communications engineers face a number of challenges today, including finding ways to maximize the amount of information that can be communicated over the limited resources available. That is, with limited frequencies available over which to communicate radio signals, and with the amount of information that people wish to communicate growing rapidly, it is important to use the available facilities as efficiently as possible. As an example, in a typical home network system, more and more equipment is being associated with the network over which a myriad of signals are conducted.

A typical home installation of a single-cable network is shown in FIG. 1 as an illustrative example of an environment 10 in which the methods, networks, systems, and apparatuses described herein may be employed. Although a home network is illustrated as an example, it should be understood that the networks of the type to which the disclosed methods, networks, systems, and apparatuses pertain should not be regarded as being limited to home applications.

The environment 10 illustrates a home network system installation having four user applications, which may comprise, for illustration and not by way of limitation, a personal video recorder (PVR) 12, a set-top box (STB) 14, a television 15, and a WiFi router 16, in various separate locations of a house 11. The PVR 12 may supply recorded video and audio signals to a television 13. The set-top box 14 may supply interactive television content to a television 17. The television 15 may receive the input signals directly. The WiFi router 16 may supply digital data signals for wireless detection by a computer 18, or the like. The particular applications may be selected from a myriad of other functional apparatuses or systems. For example, apparatuses, systems, and computer program products described herein may provide a PVR system having multiple inputs, a satellite radio system, a network hub to a wireless network, such as an IEEE 802.11b Direct Sequence network, or other device that converts radio-frequency signals to a useful user form, or the like.

It should also be noted that although a single dwelling or house 11 is shown for purposes of illustration, the methods, circuits, devices, apparatuses, and systems described herein may be employed in a myriad of other installation locations. One example may include an apartment complex in which signals may be deployed to a number of buildings to which signals received on a single-cable may be used. Another example may include a business building in which signals may be deployed to a number of offices to which signals received on a single-cable may be used. Other examples are manifold.

Intermediate frequency (IF) signals are sourced from, for example, an external plant, such as a cable television (CATV) signal source, a satellite signal source, or the like, on a coaxial cable 30. In some cases, a fiber optic cable is used in the external plant (e.g., a fiber optic service like "FiOS", provided by Verizon Communications). In such cases, the fiber is terminated in a unit that converts signals from optical domain to electrical and vice versa (such as an Optical Network Terminal (ONT) used in the FiOS system). Such a unit is inserted between the outdoor fiber optic cable and the indoor coaxial cable. The unit may be installed on the outside or the inside of the home, in front of the top splitter 24 in FIG. 1. The signals to the personal video recorder (PVR) 12, set-top box (STB) 14, television 15, and WiFi router 16 may be delivered on coaxial cables 20, 27, 29, 31, 21, and 22 via signal dividers or splitters 24, 25, and 26. In the embodiment shown, the splitter 24 is a top-level splitter that receives the signals from the external coax plant on a single cable 30, and the splitters 25 and 26 are lower level splitters. The lower level splitter 25 splits the signals from one of the outputs of the top-level splitter 24 from a cable 31 to provide the signals to cables 21 and 22. The lower level splitter 26 splits the signals from one of the outputs of the top-level splitter 24 from the cable 20 to provide the signals to cables 27 and 29.

The splitters 24, 25, and 26 are shown in FIG. 1 as being two-way splitters. However, the splitters may of any type that splits an input signal into a number of output signals, 2-, 4-, and 8-way splitters being typically employed. Sometimes splitters with non-binary number of outputs may be used, such as 6-way, or even with an odd-number of outputs, e.g. a 3-way splitter. The splitters 24, 25, and 26 are of the type that allows bi-directional passage of RF and DC signals. Thus, the splitters may feed a signal having combined user bands (UBs) to the personal video recorder (PVR) 12, set-top box (STB) 14, television 15, and WiFi router 16 in one direction. The splitters also may provide for passage of command signals (for example DiSEqC™ signals of the type described by the CENELEC EN 50494 standard command structure) between the, personal video recorder (PVR), set-top box (STB) 14, television 15, and WiFi router 16 and the ODU 28 in the other direction.

The cables 30, 31, 20, 21, 22, 27 and 29 may be of any suitable cable construction, such as a coaxial cable, plastic optical fiber (POF), or the like. It should be noted that in a single-cable network, even though there are physically different cables, for example, cables 30, 31, 20, 21, 22, 27 and 29 each carries same information, effectively providing a single-cable network. The network itself may be constructed to operate using a MoCA protocol, for example, as defined by the Multimedia over Coax Alliance. Under the MoCA protocol, each device that is connected to the network can communicate with any other device that is also connected to the network.

An abstracted high-level block diagram of the cable distribution system 50 in a network system of the type illustrated in FIG. 1 is shown in FIG. 2, to which reference is now additionally made. The cable distribution system 50 includes a top-level splitter 24, which may correspond to the top-level splitter 24 in the system 10 of FIG. 1. The top-level splitter 24 receives an input signal on line 32 from a point of entry 51 to which signals to and from the external coax plant are connected via coaxial cable 30.

The top-level splitter 24 may be an N-way splitter (additional outputs being provided in contrast to the splitter embodiment of FIG. 1), splitting the input signal on line 30 to provide the signal to n output lines 20, 31, and 52 . . . 54. The coaxial cable lines 20 and 31 correspond, for example, to the coaxial cable lines 20 and 31 shown in FIG. 1. The signals on output line 20 may be further split by a lower-level Q-way splitter 26, and the signals on output line 31 may be further split by a lower-level P-way splitter 25. (Again, each splitter is shown with additional outputs in contrast to the splitter embodiments of FIG. 1.) Although the N-way splitter 24, Q-way splitter 26, and P-way splitter 25 are labeled as possibly having a different number of outputs, N, P, and Q may be the same. The signals on the output lines 52 . . . 54 may be further split by additional lower-level splitters, not shown. The outputs from the splitters 25 and 26 and the splitters, not shown, on lines 52 and 54 may be connected to various user devices in known manner. The P and Q are integer numbers having a value in the range of 2 through 32 or higher.

For illustration, one of the outputs of the Q-way splitter 26 is connected to an outlet A in communication with the communication device #1 64. In like manner, one of the outputs of P-way splitter 25 is connected to an outlet B in communication with the communication device #2. Another of the outputs of the P-way splitter 25 is connected to an outlet M in communication with the communication device #M 68. Although not shown, it should be understood that the network 50 may include additional lower level splitters, if desired, that receive output signals from one or more lower level splitters 25, . . . , 26.

In operation, signals from the point of entry 51 are split by the various splitters in the network, ultimately to be delivered to any device on any node in the network. For example, in the embodiment illustrated, the signals at the point of entry 51 are delivered via outlet A to communication device #1 64, via outlet B to communication device #2 66, via outlet M to communication device #M 68, and to any other device, not shown, connected to a splitter output. In addition, with the network being operated in accordance with a MoCA protocol, any device, itself, can communicate with any other device in the network. Thus, for example, communication device #2 66 can communicate with communication device #M 68 along a communication channel comprising only the lower level splitter 25. Alternatively, communication device #1 64 can communicate with communication device #2 66 from outlet A, along a communication channel comprising the lower lever splitter 26, up to the top-level splitter 24, and back down through the lower level splitter 25 through outlet B.

With regard to the construction of the splitters typically used in community antenna television (CATV) home coaxial cable networks, such splitters are typically designed to pass signals up to about 1 GHz in the direction from the point of entry (POE) 51 to the various outlets, such as outlet A, outlet B, . . . , and outlet M. Since splitters are passive devices, they can also pass signals in a reverse direction up to about 1 GHz in a direction from the various outlets to the point of entry (POE) 51. Above 1 GHz, for example, between 1.1 GHz and 1.7 GHz, however, the splitter losses are higher. In the majority of cases (majority of outlets/homes), a total path loss from outlet to outlet in the 1.1 GHz to 1.7 GHz band may be less than 65 dB. This includes cable losses, in-out or out-in splitter losses, and losses due to splitter isolation. (The terms "splitter isolation" or "isolation losses" refer to path losses in the splitter from one splitter output to another output of the same splitter that must be traversed or "jumped" by the signal traveling from one network node to another through the splitter. Only one such "jump" is needed across any particular splitter to close the signal path.) With 65 dB of loss, using a channel bandwidth of about 200 MHz, a throughput of close to 1 Gigabits/second (Gbps) can be achieved, for example, in a MoCA 2.0 networking system. The loss characteristics of home coaxial cable systems in the frequency range above about 2 GHz, however, is generally considered excessively lossy, and, as such, this frequency range is unsuitable or unusable for communications. Moreover, to achieve data rates on the order of 10 Gbps and above, the bandwidth available in this frequency range is not sufficient in present-day networks.

Thus, in a frequency range above 2 GHz, up to 10 GHz or more, a bandwidth of 8 GHz, or more, is unusable in today's home coaxial cable networks, due to the very high path loss from outlet to outlet at these frequencies. An analysis of home systems shows that the outlet-to-outlet loss in 2-10 GHz range can be up to 90 dB in a vast majority of cases. This 90 dB signal loss is excessive, and limits the achievable communications rate because the received signal-to-noise ratio (SNR) is low, even assuming a transmitter power of +10 dBm and a receiver noise figure of 5 dB (i.e., levels that are typical of the current state of the art RF front-end technology for consumer products). According to Shannon's channel capacity theory, in this case the channel capacity is limited to about 1 Gbps, even if an 8 GHz bandwidth is used. That is, under these conditions, increasing the channel bandwidth cannot increase the channel capacity above 1 Gbps. This is illustrated in the graph in FIG. 3, which shows a plot of channel bandwidth in GHz vs. maximum transmission rate in Gbps for a 90 dB path loss, assuming the above stated transmission and reception characteristics. It can be seen that the curve 70 is essentially flat, indicating that increasing the channel bandwidth does not result in an increase in the maximum transmission rate that can be achieved.

What is needed are methods, circuits, devices, apparatuses, and systems that can be used in coaxial cable networks of the type described that can achieve an increased channel capacity.

SUMMARY

The following presents a simplified summary in order to provide a basic understanding of some aspects of the embodiments of the disclosed method and apparatus. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description presented later.

One embodiment of the presently disclosed method and apparatus provides a networking system achieving 10 Gigabits/second (Gbps) throughput or more on a coaxial cable network. The system operates at high frequencies (i.e., above the existing services on home coax). Accordingly, the system operating frequencies are in the range 2 GHz to 10 GHz or more. In some embodiments such as CATV home plants, the range may start at 2 GHz. In other embodiments, such as in satellite home installations, the range may start at 2.5 GHz or 3 GHz. The system uses a wide signal bandwidth, for example in the range of 8 GHz. The networking system coexists with these services without mutual interference, since it operates above the CATV band of approximately 1 GHz and alternatively above the band used for satellite services of 2.15 GHz (or in some cases up to 2.7 GHz). The disclosed system is useful in future networking systems, such as MoCA 3, and in Access systems.

Path losses that occur in the system are dominated by splitter losses. This is true even at the upper range of the band. Thus, the path loss can effectively be reduced by reducing the loss of the splitters in the path. Such reduction is achieved in the methods, circuits, devices, apparatuses, and systems described herein by using a splitter with a low loss and low isolation in the 2-10 GHz range. The most effective location of this splitter is at the point-of entry (POE).

Alternatively, using an active node at the point-of-entry (POE), providing a signal booster, or providing a repeater can solve the problem caused by the path loss that occurs when the signal traverses the splitters. With an active booster or repeater at the point-of-entry (POE) node, the loss from outlet to outlet can essentially be reduced to that of the point-of-entry (POE) to outlet, that is, the present day 90 dB loss can effectively be reduced to a 70 dB loss, or less.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

In the various figures of the drawings, like reference numerals are used to denote like or similar parts.

DETAILED DESCRIPTION

The principles, apparatuses, circuits, methods, and systems described herein address in an efficient and cost effective manner, the problems that occur due to excessive loss in coaxial cable systems such as those used in home installations having a frequency range above about 2 GHz. The solutions presented herein take advantage of the vast available bandwidth and enable extremely high communications rates. By operating at higher frequencies, potentially greater frequency separation from existing services on coaxial cables can be realized, facilitating easier and lower cost of filtering and diplexing with filters from other services.

Figure 1:
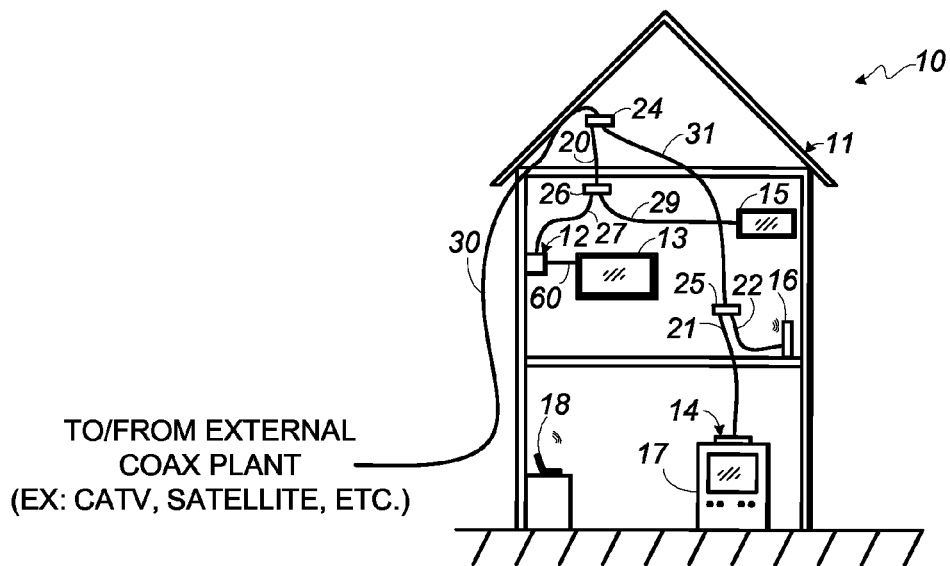
FIG. 1 illustrates an example of one environment in which the principles, apparatuses, methods, and systems described herein may be employed.
Figure 2:
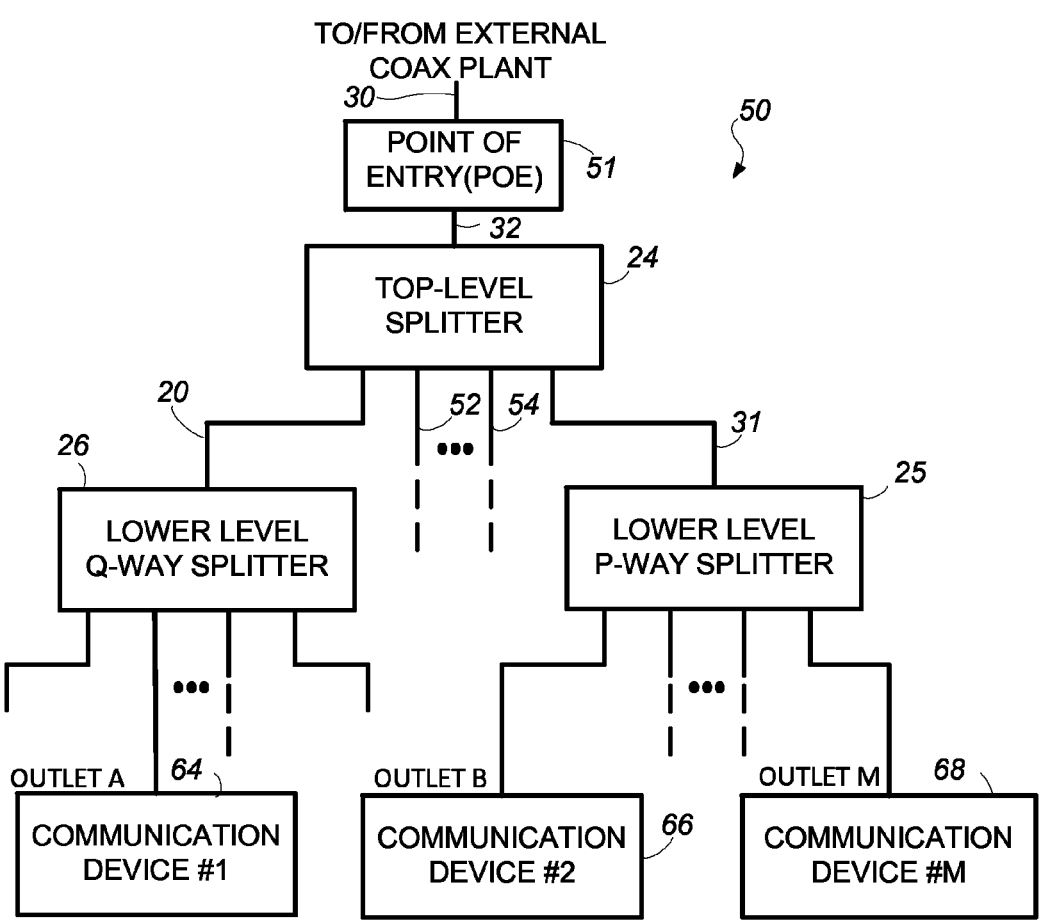
FIG. 2 illustrates an abstracted block diagram of an example of a signal splitter arrangement that may be used, for instance, in realizing a network of the type shown in FIG. 1, employing, for example, a MoCA protocol.
Figure 3:
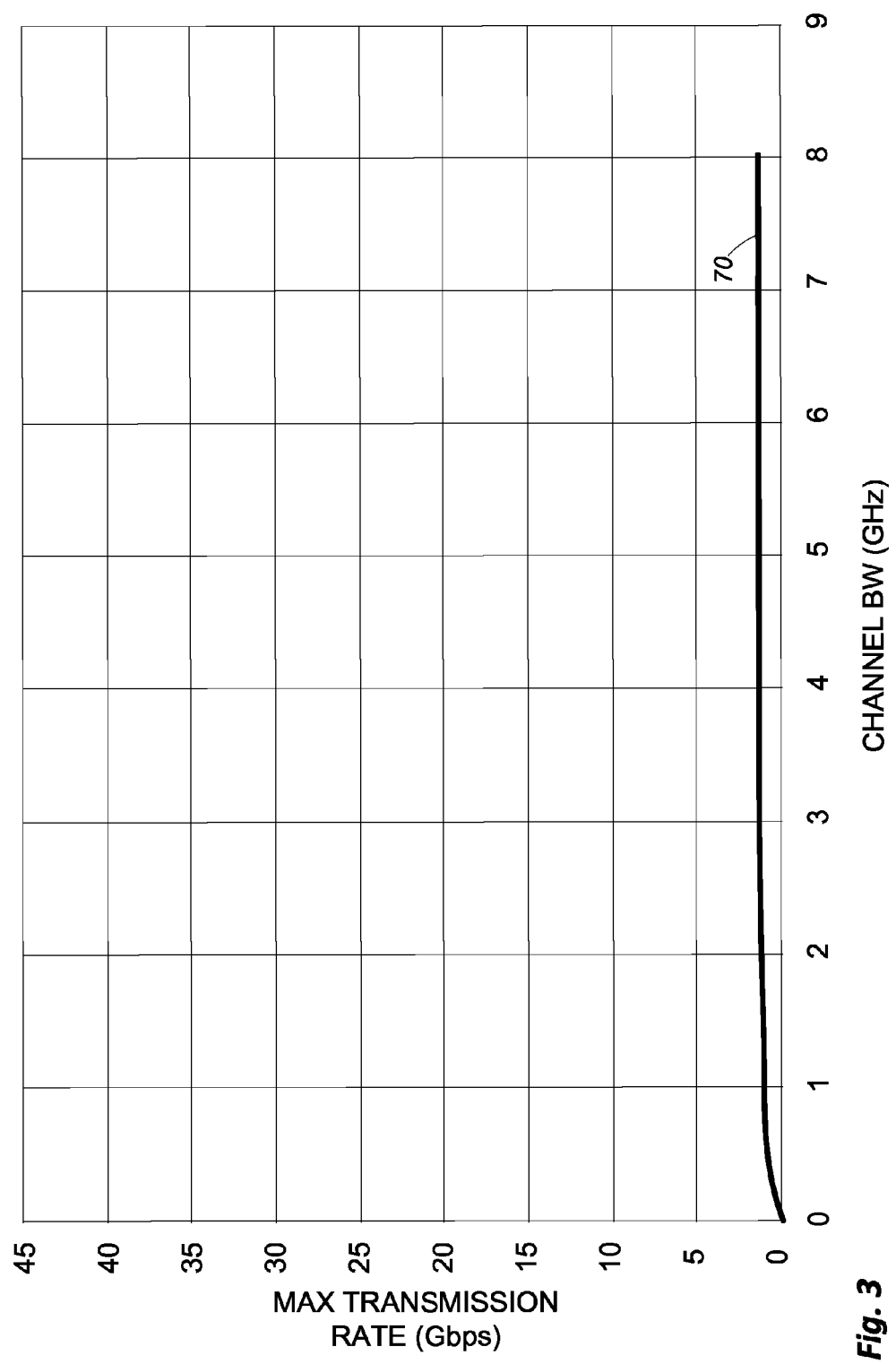
FIG. 3 is a graph showing maximum transmission rate in Gigabits/second (Gbps) of a channel as a function of channel bandwidth in GHz, for a channel having a 90 dB path loss.
Figure 4:
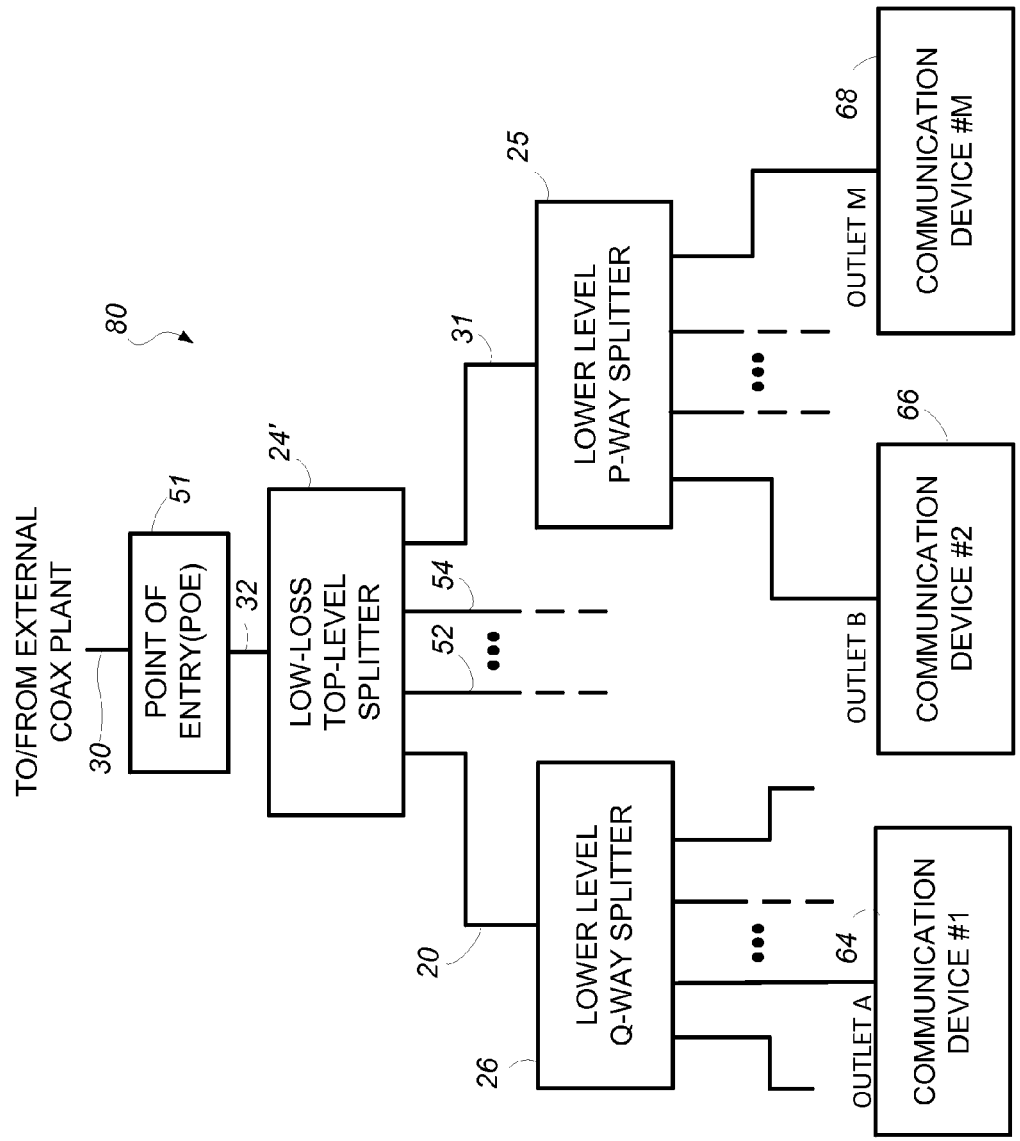
FIG. 4 illustrates an abstracted block diagram of an example of a signal splitter arrangement that may be used, for instance, in realizing a network of the type shown in FIG. 1, employing, for example, a MoCA protocol and having a low loss splitter as a top-level splitter.

One network embodiment 80 is shown in FIG. 4. The network embodiment 80 is similar to the network embodiment 50 described above with reference to FIG. 2, except a low loss splitter 24' has been installed at the point-of-entry (POE) 51. The characteristics of the low loss splitter 24' provide low loss and low isolation in the 2-10 GHz operating range. Accordingly, the path loss introduced by the isolation between outputs of the low loss splitter 24' is reduced by at least about 10 dB, or more. A typical improvement may be in the range of 15 to 20 dB. This reduces the channel loss, thereby improving the link budget and enabling higher data rates. Of course, if the path loss can be further decreased, even higher data rates can be achieved. This is illustrated in FIG. 5.

Figure 5:
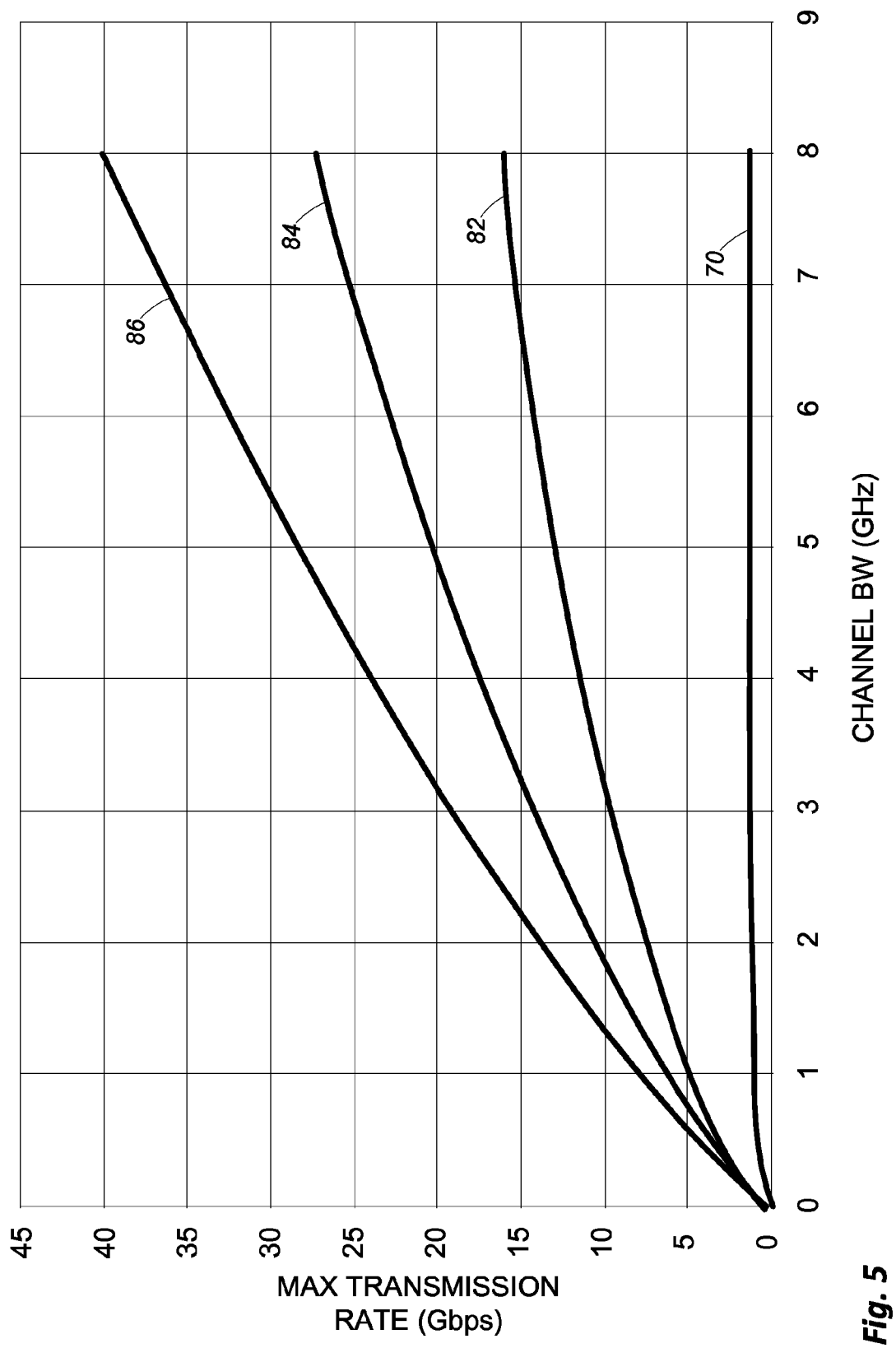
FIG. 5 is a graph showing maximum transmission rate in Gbps of a channel as a function of channel bandwidth in GHz, for a channel having various amounts of path loss.

The graph of FIG. 5 shows "maximum transmission rate" in Gigabits/second (Gbps) of a channel as a function of channel bandwidth in GHz, for a channel having various amounts of path loss, and assuming +10 dBm of transmitted RF power at the transmitter and a noise figure of 5 dB at the receiver end. Line 70 represents a path loss of about 90 dB, as described above. Line 82 represents a path loss of about 75 dB. Line 84 represents a path loss of about 70 dB. Line 86 represents a path loss of about 65 dB. This graph reveals that by reducing the loss from 90 dB to 75 dB (a 15 dB reduction), a substantial rise in capacity can be achieved. For example, an improvement from 1 Gbps (line 70 on FIG. 5) to as much as 16 Gbps (line 82 on FIG. 5) can be achieved with an 8 GHz bandwidth. Another 5 dB of loss reduction (to about 70 dB path loss) increases the rate to above 25 Gbps (line 84 on FIG. 5). There is a high probability that the large loss of 90 dB will occur in the "longest paths". For example, large losses will likely occur in the path from outlet A 64 up to the top level splitter 24, then jumping the splitter 24 and down to outlet B 66. Therefore, the weakest links are those that encounter the isolation of the top level splitter 24. This means that lowering the isolation of the top-level splitter 24 (i.e. by replacing the splitter 24 with a low-loss splitter 24') located at the point-of-entry will lower the loss of the worst-case paths. This will improve the channel capacity and reduce the limitations of the network.

The isolation of the existing splitters (i.e., those in the installed base and those currently being installed in the 2-10 GHz band networks) is on the order of 20 to 50 dB. In the worst case paths in the existing networks, it is likely that the isolation of the top level splitter 24 at the point-of-entry is closer to the 50 dB. Reducing this loss by 15-20 dB (by using the low loss splitter 24' at the top level) will reduce the path loss and enable a larger channel capacity (i.e., on the order of 20 Gbps). With this capacity, considering implementation losses and coding, physical layer rates on the order of about 15 Gbps and MAC rates, or throughput, of over 10 Gbps are possible. For paths having lower loss, even higher data rates in the channel can be achieved.

In addition to the foregoing, the modulation format of the signal in the network may be optimized for the channel characteristics, such as by considering reflections and multipath that occurs on the channel. Orthogonal frequency-division multiplexing (OFDM), for example, may be advantageously used in any of the embodiments described herein. However, it should be understood that the principles described herein are not limited to any particular modulation type.

For the technical reasons stated above, one effective location for the low loss splitter 24' is at the point of entry (POE) 51. Moreover, in most home installations, the top-level splitter is normally placed where it will be readily available to service technicians. Thus, it should be easy to retrofit home networks in order to increase channel capacity by replacing the top-level splitter. Such a replacement may be sufficient for most purposes.

Figure 6:
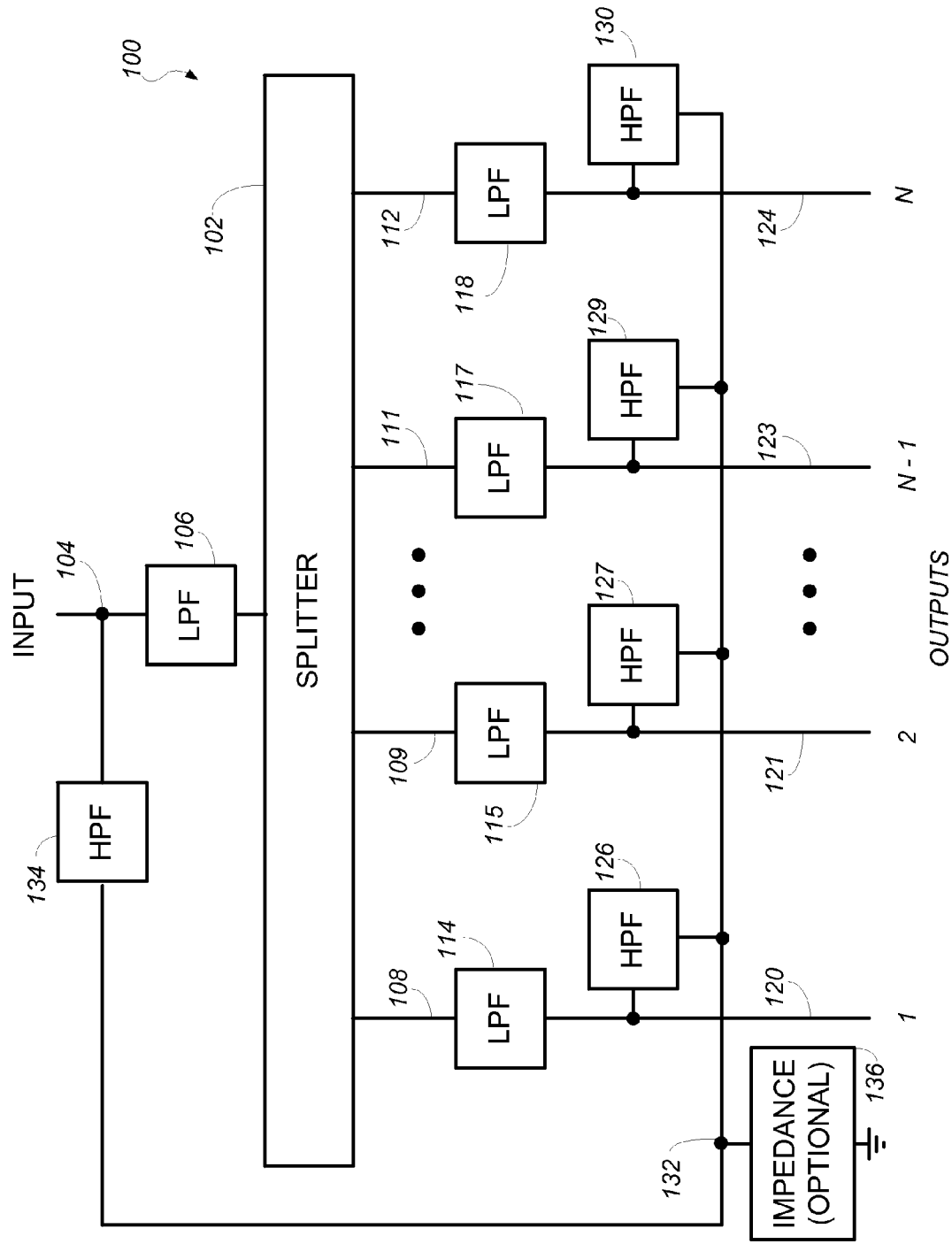
FIG. 6 is a block diagram illustrating one embodiment of a low loss splitter that may be used in the networks of the type described herein.

FIG. 6 is a block diagram illustrating one embodiment of an N-way low loss splitter 100 that may be used in the networks of the type described herein. The N is an integer number having a value in the range of 2 through 32 or higher. The N-way low-loss splitter 100 may include a standard signal splitter 102, which receives its input from the input line 104. The signal on the input line 104 is filtered by a low pass filter 106. The outputs from the N-way signal splitter 102 are derived on output lines 108, 109, . . . , 111, and 112. Low pass filters (LPFs) 114, 115, . . . 117, and 118 are connected on lines 108, 109, . . . , 111, and 112. The outputs of the low pass filters 114, 115, . . . 117, and 118 provide the outputs from the N-way low loss splitter 100 on output lines 120, 121, . . . , 123, and 124, labeled as outputs 1, 2, N−1 and N, respectively. High-pass filters 126, 127, . . . , 129, 130 are respectively connected between the output lines 120, 121, . . . , 123, and 124 and a common junction 132. Each high pass filter has a non-overlapping passband with a corresponding low pass filter. In one embodiment, a high pass filter 134 connects the common junction 132 and the input line 104. However, in an alternative embodiment, the high pass filter 134 is not used. Leaving out the filter 134 allows the low pass filter 106 to block high frequency signals used by the network for communications between devices coupled to the outputs 120, 121, 123, 124 from passing out to line 104.

The low pass filters (LPFs) 114, 115, . . . 117, and 118 and high pass filters (HPFs) 126, 127, . . . , 129, 130 are diplexed, having non-overlapping passbands. The N-way low loss splitter 100 achieves low loss from any port to any other port (i.e., from input to any output and reverse and from any output to any other output) above a frequency of about 2 GHz. The loss in this configuration includes a mismatch loss, a split loss, and a dissipative insertion loss. The mismatch loss can be calculated as $10 \cdot \log [1-(N-1)^2/(N+1)^2]$ and the split loss is $10 \cdot \log(N)$, where N is the split number. For example, for N=4 (a 4-way splitter), the mismatch loss is 2 dB, the split loss 6 dB and assuming a dissipative insertion loss of 3 dB, total loss from any port to any other port is 11 dB. This favorably compares with the isolation of a 4-way splitter typically in the range of 20 dB to 50 dB.

In one embodiment, the low pass filters (LPFs) 114, 115, . . . 117, and 118 have a cutoff at about 1.7 GHz and the high-pass filters (HPSs) 126, 127, . . . , 129, 130 at about 2 GHz. In another embodiment, the low pass filters (LPFs) 114, 115, . . . 117, and 118 have a cutoff at about 2.15 GHz and high-pass filters (HPFs) 126, 127, . . . , 129, 130 at about 2.5 GHz. In yet another embodiment, the high-pass filters (HPFs) 126, 127, . . . , 129, 130 may be replaced with bandpass filters (BPFs) with cutoff between about 2 and 10 GHz.

If desired, the HPFs may be provided with series resistors to provide impedance matching. The resistors may be arranged, for example, to form a resistive splitter in a star configuration. If resistor's values are chosen to be (N−1)/(N=1)*line impedance (e.g. 75 Ohms), then there is no mismatch loss, but the insertion loss is higher. The benefit is a reduction in signal reflection and multipath conditions in the network. For a 4-way splitter, for example, the total loss is about 15 dB (12 dB resistive splitter loss plus 3 dB filters insertion loss). This compares with 11 dB in the previous embodiment.

In another embodiment, as shown in FIG. 6, an impedance 136 is connected between common junction 132 and a reference potential point, such as ground, to optimize matching and/or to participate in filtering. As noted above, in one embodiment, the high pass filter HPF 134 connected to the input node is eliminated, so that isolation of only the output ports is addressed. This may be preferred in the point-of-entry (POE) location in line 104.

Figure 7:
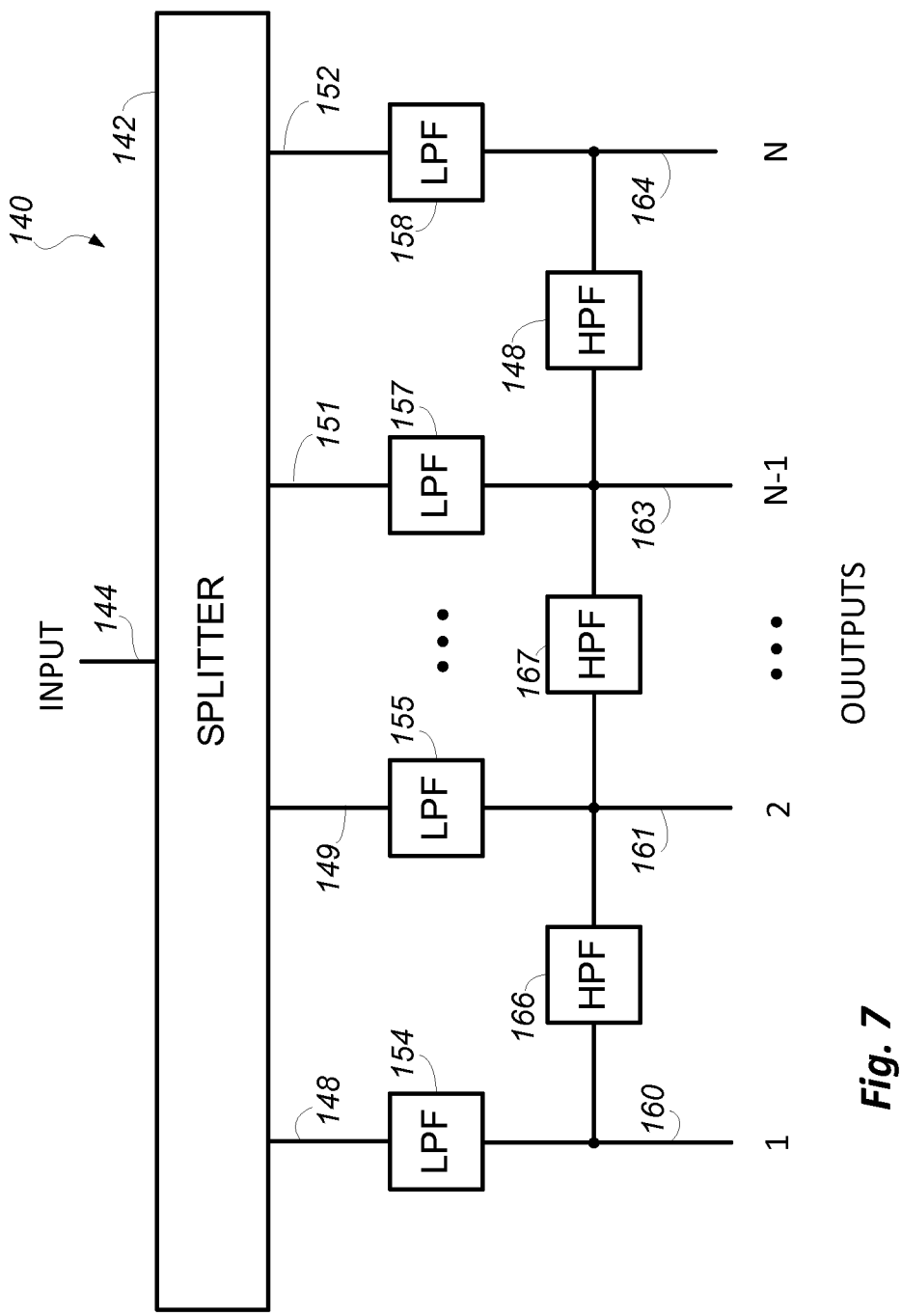
FIG. 7 is a block diagram illustrating another embodiment of a low loss splitter that may be used in the networks of the type described herein.

FIG. 7 is a block diagram illustrating another embodiment of an N-way low loss splitter 140 that may be used in the networks of the type described herein. The N-way low-loss splitter 140 may include a standard N-way signal splitter 142, which receives its input on input line 144. The outputs from the N-way signal splitter 142 are derived on output lines 148, 149, . . . , 151, and 152. Low pass filters (LPFs) 154, 155, . . . 157, and 158 are connected on lines 148, 149, . . . , 151, and 152. The outputs of the low pass filters 154, 155, . . . 157, and 158 provide the outputs from the N-way low loss splitter 140 on output lines 160, 161, . . . , 163, and 164, labeled as outputs 1, 2, N−1 and N, respectively. High-pass filters (HPFs) 166, 167, . . . , and 169 are between the respective signal outputs from the N-way signal splitter (i.e., output lines 160 and 161, 161 . . . 163, 163, and 164).

In the embodiment shown in FIG. 7 the low pass filters (LPFs) 154, 155, . . . 157, and 158 and High-pass filters (HPFs) 166, 167, . . . , and 169 have non-overlapping passbands (i.e., they are diplexed). The N-way splitter 140 achieves low loss from any output port to any other output port above the filters cutoff frequencies. In one embodiment, the low pass filters (LPFs) 154, 155, . . . 157, and 158 have a cutoff at 1.7 GHz and the high-pass filters (HPFs) 166, 167, . . . , and 169 at 2 GHz.

The construction shown in FIG. 6 or 7 ensures that the channel loss is reduced by at least 10 dB, which is a significant amount in terms of channel capacity increase, as implied by the graph in FIG. 5. Accordingly, there is an improvement in the link budget that enables high data rates. Of course, if the path loss can be further decreased, even higher data rates can be achieved.

Figure 8:
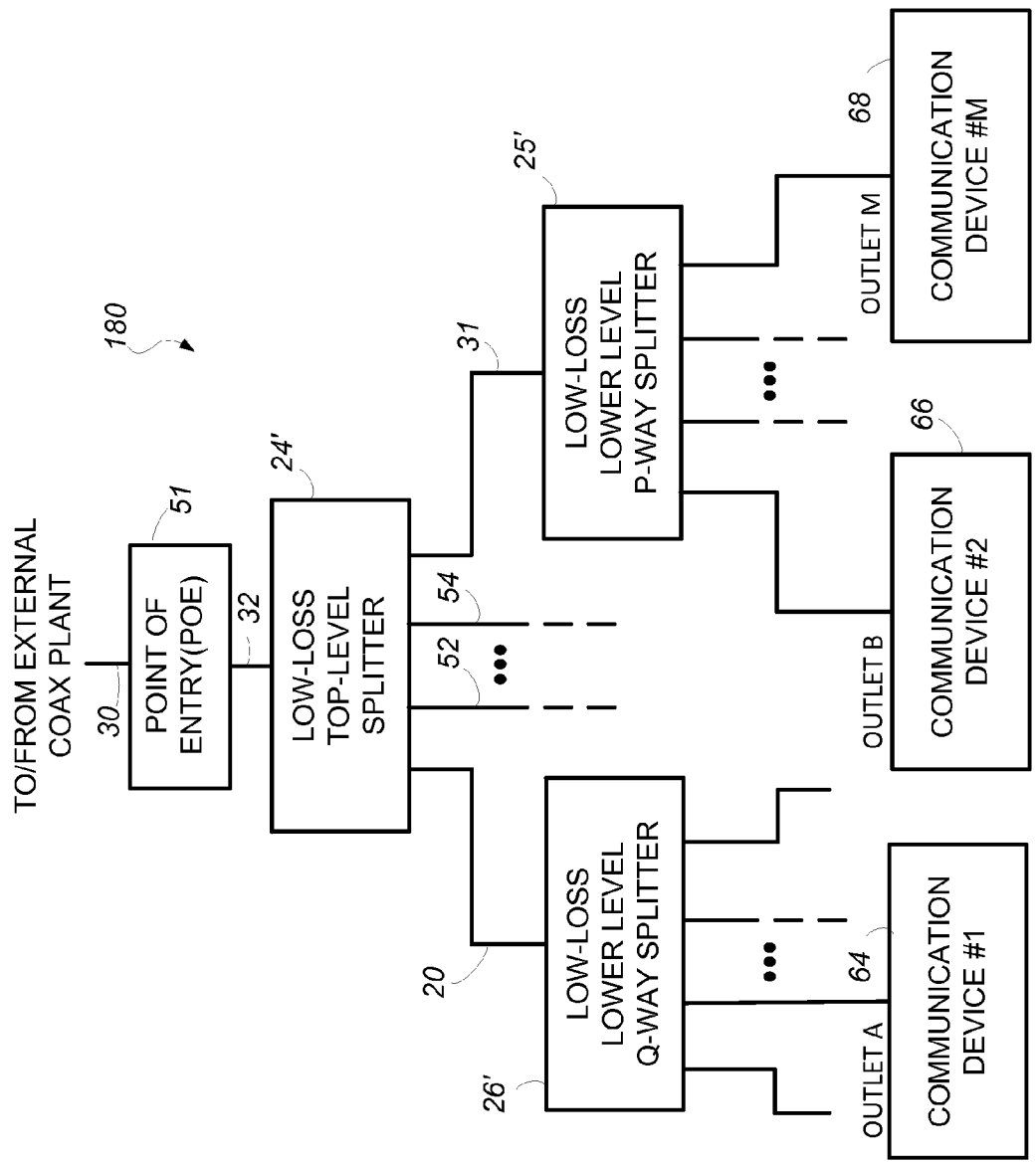
FIG. 8 illustrates an abstracted block diagram of another example of a signal splitter arrangement that may be used, for instance, in realizing a network of the type shown in FIG. 2, employing, for example, a MoCA protocol and having a low loss top-level and lower-level splitters.

In FIG. 4 above, a low loss/low-insertion low loss splitter 24' was employed as a top-level splitter. Alternatively, for even greater channel capacity, the network embodiment of FIG. 8 may be employed. FIG. 8 illustrates another example of a low loss splitter arrangement 180 having both low loss top-level and lower-level splitters that may be used, for instance, in realizing a network of the type shown in FIG. 4. The network may also employ, for example, a MoCA protocol.

The network embodiment 180 is similar to the network embodiment 50 described above with reference to FIG. 2, except a top-level low loss splitter 24' has been installed at the point-of-entry (POE) 51 and low loss lower-level splitters 25' and 26' have been inserted in place of the normal lower-level splitters. The characteristics of the top-level low loss splitter 24' provide a low loss and low isolation in the 2-10 GHz operating range. Accordingly, the path loss introduced by the low loss splitter 24' is reduced by at least about 10 dB, or more, as described above. The characteristics of the low loss lower-level splitters 25' and 26' may be substantially the same.

Figure 9:
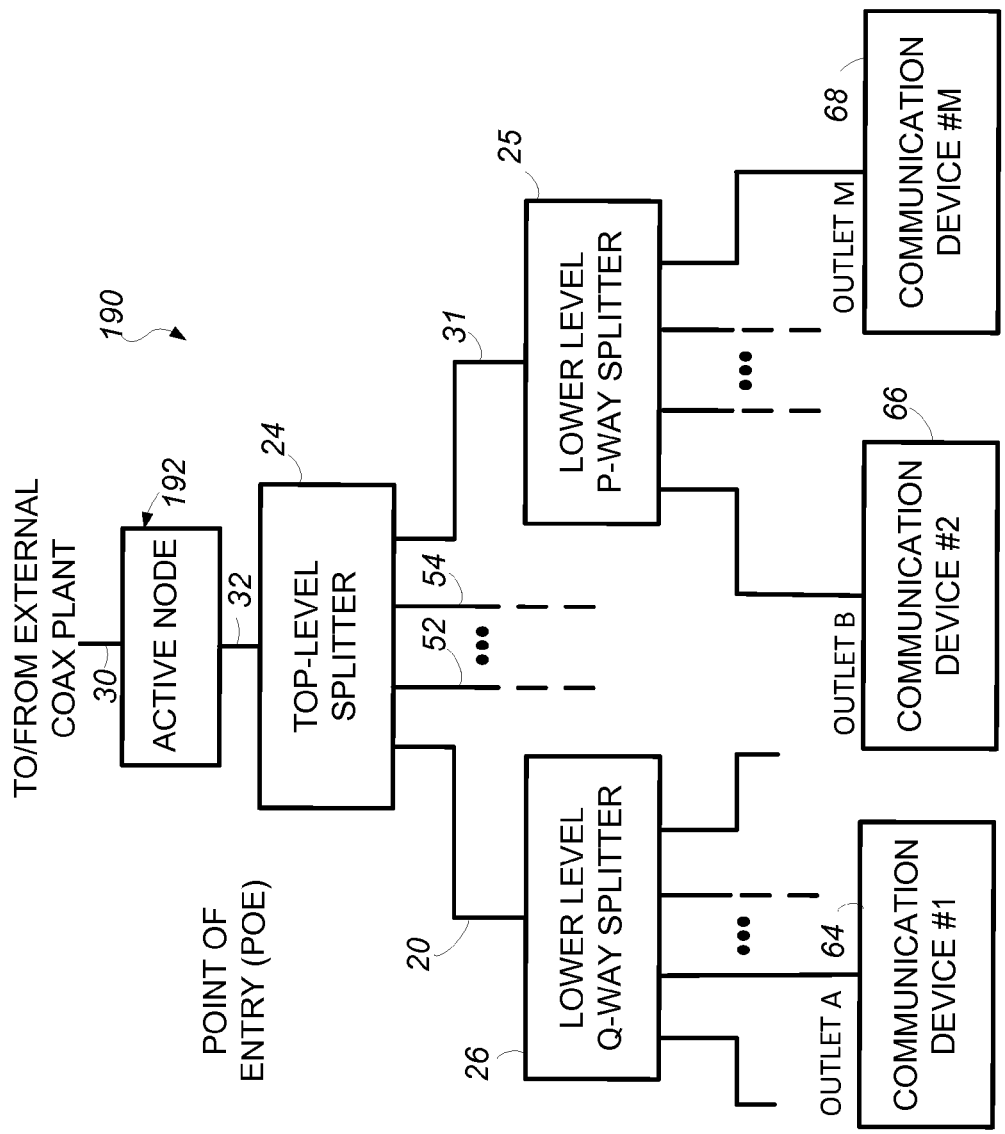
FIG. 9 is an abstracted block diagram of another example of a splitter arrangement that may be used in realizing a network of the type shown in FIG. 2, having an active node at the input of the top-level splitter 24.

FIG. 9 illustrates another embodiment 190 in which channel loss is reduced by at least 10 dB. The embodiment 190 has an active node installed at the input of the top-level splitter 24.

The remainder of the embodiment 190 is substantially the same as the embodiment 50 described above with reference to FIG. 2.

The active node 192 amplifies and retransmits the signal into and out of the network and provides an improvement in the link budget. That improvement enables high data rates. In one embodiment, the active node is a frequency translator, described below with reference to FIG. 10. Alternatively, the active node is a digital repeater, described below with reference to FIG. 11. The active node may communicate with an Access node in the external coax plant and provide a dual function, accessing and home networking. This is illustrated below with reference to FIG. 12.

Figure 10:
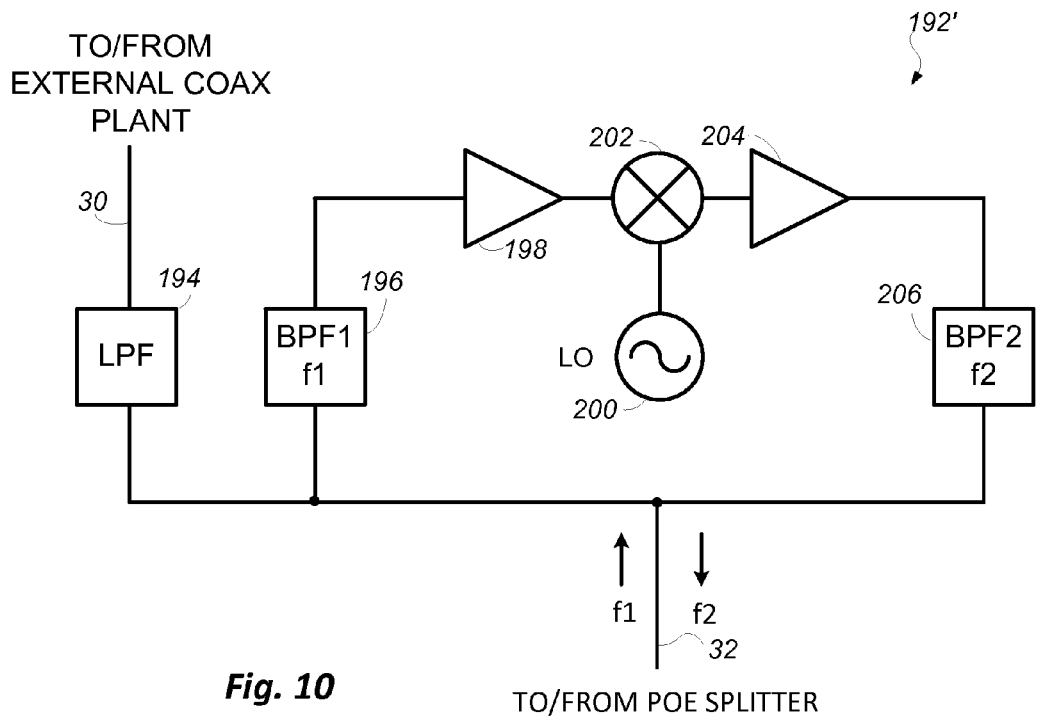
FIG. 10 is a block diagram of an example of an active node of the type having a frequency translator that may be used in the splitter arrangement of FIG. 9.

FIG. 10 is a block diagram of an example of an active node 192' of the type having a frequency translator used in the splitter arrangement of FIG. 9. The signal 30 to and from the external coax plant is filtered first by a low pass filter (LPF) 194 and passed down into the home network. The signal coming from the home network (i.e. from POE splitter) at frequency f1 is filtered by a first band pass filter (BPF1)196. The filtered signal is then amplified by an amplifier 198 and mixed in a mixer 202 with a local oscillator signal from a local oscillator 200. The output from the mixer 202, now at a second frequency, f2, is amplified and passed through a second band pass filter (BPF2) 206 and sent to the input of the top-level splitter 24 at the point-of-entry (POE).

The active node 192' is a two-way circuit. The active node 192' provides signals to the top-level splitter 24 at the second frequency, f2, but also receives signals back from the top-level splitter 24 at the first frequency, f1. Thus, for example, in operation, if a signal is received from a communication device, for instance, communication device #1 64 (See FIG. 2) at frequency f1 for delivery to communication device #2 66, the received signal is amplified and returned to communication device #2 66 at frequency f2.

The low pass filter (LPF) 194, the first band pass filter (BPF1), and the second band pass filter (BPF2) are diplexed, whereby they have non-overlapping passbands. Only one node transmits at a time in the network. The transmission is scheduled by a Network Coordinator (not shown), which may be one of the network nodes, for example one of the communications devices shown in FIG. 2. The transmission frequency normally is f1 and the receive frequency is normally f2 for the network nodes. In the active node 192', however, it is the opposite; the signal is received in f1 band, passed through the first band pass filter (BPF1) 196, amplified, translated to band f2, amplified and returned to the network via the second band pass filter (BPF2) 206 at f2. It should be noted that a high pass filter (not shown) can be used in place of the second band pass filter (BPF2) 206.

In one embodiment of the access node 192' the first frequency, f1, band may be from 2 GHz to 6 GHz and the second frequency, f2, band from 6.3 GHz to 10.3 GHz. In another embodiment of the access node 192', the amplifiers may be gain-controlled and an AGC loop may be used. In yet another embodiment, the active node 192' may be used in conjunction with a low loss splitter, for example the low loss splitter 24' shown in FIG. 6, described above.

Figure 11:
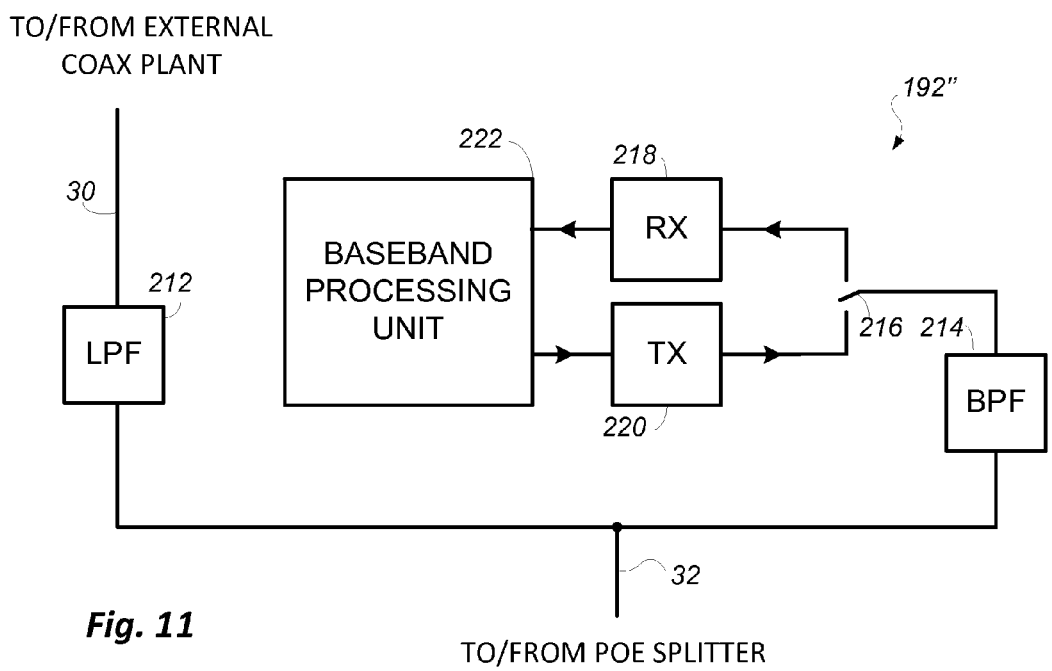
FIG. 11 is a block diagram of an example of an active node of the type having a digital repeater that may be used in the splitter arrangement of FIG. 9.

FIG. 11 is a block diagram of an example of an active node 192" of the type having digital repeater mode of operation used in the splitter arrangement of FIG. 9. The embodiment 192" includes a low pass filter (LPF) 212 to filter a signal to and from the external coax plant. One side of the low pass filter (LPF) 212 is connected to line 32 to the input of the point of entry splitter, which may be, for example, the top-level splitter 24 in FIG. 9.

A band pass filter (BPF) 214 is connected between line 32 and a receiver/transmitter selection switch 216 which selectively connects the band pass filter (BPF) 214 to a receiver 218 or to a transmitter 220. When the receiver/transmitter selection switch 216 selects the receiver 218, the signals are directed to a baseband processing unit 222 from the band pass filter (BPF) 214. When the switch selects the transmitter 220, the signals are directed from the baseband processing unit 222 to the band pass filter (BPF) 214.

In the active node embodiment 192" of FIG. 11, the low pass filter (LPF) 212 and the band pass filter (BPF) 214 are diplexed to have non-overlapping passbands. A high pass filter (HPF) may alternatively be used in place of the of the band pass filter (BPF) 214. Only one node transmits at a time in the network. The transmissions are scheduled by a Network Coordinator, which may be one of the network nodes, for example, one of the communications devices 64, 66, . . . , 68 shown in FIG. 9. The Network Coordinator functions may also be provided by this active node 192".

The transmission frequency and the receive frequency for all network nodes and the active node are the same, inside the passband of the band pass filter (BPF) 214. In a receive mode, the switch is connected to the receiver 218, whereby the active node 192", performs the function of a digital repeater. The receiver 218 receives a signal from a transmitting node, demodulates it, and stores it as data packets in the baseband processing unit 222. Upon completion of the transmission from the transmitting node, the receiver/transmitter selection switch 216 connects to the transmitter 220. The digital repeater then remodulates and re-transmits packets by transmitter 220 back into the network at a higher power. Thus, the remote nodes in the network can receive the retransmitted signal with an improved signal-to-noise ratio (SNR). With an active repeater at the point-of-entry node, the loss from outlet to outlet can essentially be reduced to that of the point-of-entry to outlet loss. Thus, the 90 dB loss of current systems can effectively be reduced to a 70 dB loss, or better, improving the signal-to-noise ratio (SNR) and increasing the channel capacity.

In one embodiment of the active node 192", the signal bandwidth may be 8 GHz and the passband of the band pass filter (BPF) may be from 2 GHz to 10 GHz. In another embodiment, the active node 192" may be used in conjunction with a low loss splitter, for example the low loss splitter 24' shown in FIG. 6, described above.

Figure 12:
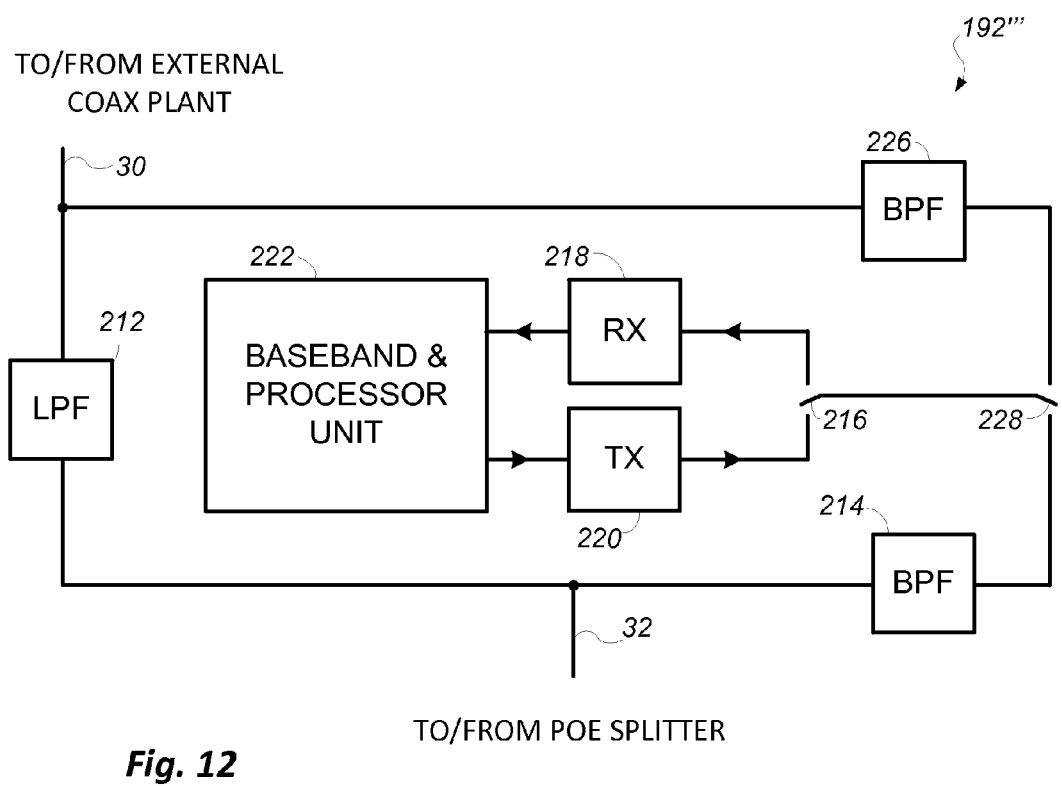
FIG. 12 is a block diagram of an example of an active node of the type having a digital repeater that may be shared in the splitter arrangement network of FIG. 9 and with an Access system.

FIG. 12 is a block diagram of another example of an active node 192'''. In one embodiment, the active node 192''' is a digital repeater. The active node 192''' is useful in a network such as that shown in FIG. 9, but wherein the communications devices 64, 66, 68 can communicate with each other and also engage in bidirectional communications with the External Coax Plant, such as is the case in an Access network. An Access system provides access to wide area networks and the Internet, for example, by aggregating multiple channels of information including voice and data across a single shared access link provided by a service provider via a cable (CATV) network or the like.

The active node 192''' is similar to the active node 192", described above, with the addition of a band pass filter (BPF) 226. The filter 226 is switchably connected between the line 30 and the baseband and processor unit 222. Switching of the filtered signal to and from the band pass filter (BPF) 226 is accomplished by additional switch 228. Accordingly, the active node 192''' is switchable between network access and external access in one frequency band.

The low pass filter (LPF) 212 and band pass filters (BPFs) 214 and 226 are diplexed, having non-overlapping passbands.

The two band pass filters (BPFs) 214 and 226 have substantially the same cutoff frequencies. As noted above, high pass filters (HPFs) can be used in place of the of the band pass filters (BPFs) 214 and 226.

In operation, only one node at a time transmits in the system. The transmission is scheduled by a network coordinator, which may be one of the network nodes, for example, one of the communications devices 64, 66, . . . , or 68 shown in FIG. 2. The network coordinator function may also be accomplished by this active node 192′″. The network coordinator function is coordinated with an Access Controller (not shown) in the external coax plant.

The transmission frequency and the receive frequency are the same for all of the network nodes, the active node 192′″, and the access controller node in the external coax plant. The transmission and receive frequencies are within the passbands of the band pass filters (BPFs) 214 and 228. The active node 192′″, which performs the function of a digital repeater, receives a signal from a transmitting node, demodulates the signal, and stores data packets in the baseband and processor unit 222. Upon completion of the transmission from the transmitting node, the digital repeater remodulates and re-transmits the data packets back into the network at higher power. This enables a remote node to receive the data packets with an improved signal-to-noise ratio (SNR). The receiver/transmitter selection switch 216 is controlled accordingly. The output switch 228 also is controlled accordingly, pointing either towards the access node in the external coax plant or the POE splitter (for example, the splitter 24 shown in FIG. 2) in the internal plant.

In one embodiment, the signal bandwidth may be about 8 GHz and the pass-band of the band pass filters 214 and 228 may be from about 2 GHz to about 10 GHz. In another embodiment, the active node 192′″ may be used in conjunction with a low loss splitter, for example the low loss splitter 24′ shown in FIG. 6, described above.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described.

Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A low loss splitter having:
    a) an N-way signal splitter having an input and a plurality of outputs, wherein N is an integer number in the range from 2 through 32;
    b) a first low pass filter for receiving a signal from a coaxial cable for delivery to the input of the N-way signal splitter;
    c) a plurality of additional low pass filters for receiving signals from respective outputs of the N-way signal splitter and providing respective signal outputs from the low loss splitter for connection to respective coaxial cable output lines; and d) a plurality of high pass filters, each between one of the signal outputs of the low loss splitter and a common junction, each high pass filter having non-overlapping passband with a corresponding low pass filter.

2. The low loss splitter of claim 1, further comprising an additional high pass filter between the common junction and the input of the low loss splitter.

3. The low loss splitter of claim 2, further comprising an impedance between the common junction and a reference potential point.

4. The low loss splitter of claim 1, wherein the low pass filters have a cutoff frequency of about 1.7 GHz and the high pass filters have a cutoff frequency of about 2 GHz.

5. The low loss splitter of claim 1, wherein the low pass filters have a cutoff frequency of about 2.15 GHz and the high pass filters have a cutoff frequency of about 2.5 GHz.

6. A low loss splitter comprising:
a) an N-way signal splitter having an input for receiving a signal from a coaxial cable and a plurality of outputs, wherein N is an integer number in the range from 2 through 32;
b) a plurality of low pass filters for receiving signals from respective outputs of the N-way signal splitter and providing respective signal outputs from the N-way signal splitter for connection to respective coaxial cable output lines; and
c) a plurality of high pass filters between the respective signal outputs from the N-way signal splitter, each high pass filter having non-overlapping passband with each respective low pass filter.

7. The low loss splitter of claim 6, wherein the low pass filters have a cutoff frequency of about 1.7 GHz and the high pass filters have a cutoff frequency of about 2 GHz.

8. The low loss splitter of claim 6, wherein the low pass filters have a cutoff frequency of about 2.15 GHz and the high pass filters have a cutoff frequency of about 2.5 GHz.

9. A low loss splitter having:
a) an N-way signal splitter having an input and a plurality of outputs, wherein N is an integer number in the range from 2 through 32;
b) a first low pass filter for receiving a signal from a coaxial cable for delivery to the input of the N-way signal splitter;
c) a plurality of additional low pass filters for receiving signals from respective outputs of the N-way signal splitter and providing respective signal outputs from the low loss splitter for connection to respective coaxial cable output lines; and
d) a plurality of band pass filters, each between one of the signal outputs of the low loss splitter and a common junction, each band pass filter having non-overlapping passband with a corresponding low pass filter.

10. The low loss splitter of claim 9, further comprising an additional band pass filter between the common junction and the input of the low loss splitter.

11. The low loss splitter of claim 10, further comprising an impedance between the common junction and a reference potential point.

12. The low loss splitter of claim 9, wherein the low pass filters have a cutoff frequency of about 1.7 GHz and the band pass filters have a low cut-off frequency of about 2 GHz and a high cut-off frequency of about 10 GHz.

13. A low loss splitter comprising:
a) an N-way signal splitter having an input for receiving a signal from a coaxial cable and a plurality of outputs, wherein N is an integer number in the range from 2 through 32;
b) a plurality of low pass filters for receiving signals from respective outputs of the N-way signal splitter and providing respective signal outputs from the N-way signal splitter for connection to respective coaxial cable output lines; and
c) a plurality of band pass filters between the respective signal outputs from the N-way signal splitter, each band pass filter having non-overlapping passband with each respective low pass filter.

14. The low loss splitter of claim 13, wherein the low pass filters have a cutoff frequency of about 1.7 GHz and the band pass filters have a low cut-off frequency of about 2 GHz and a high cut-off frequency of about 10 GHz.

15. A coaxial cable network, comprising:
a) a network entry point for connection to pass signals to and from an external coax plant;
b) a top-level signal splitter, having a signal input port and a plurality of signal output ports;
c) an active node for receiving and sending the signals to and from the network entry point at a first frequency, to receive signals from coaxial cable network nodes at the first frequency through the top-level splitter, and to send amplified signals to the network nodes at a second frequency through the top-level splitter; and
d) a plurality of lower level signal splitters, each having an input connected to receive signals from a respective signal output port of the top-level signal splitter, and each having a plurality of signal output ports for connection to respective network nodes.

16. The coaxial cable network of claim 15, wherein said active node comprises:
a) a low pass filter to pass the signals to and from the network entry point at a first frequency;
b) a first band pass filter to pass signals at the first frequency from the network entry point and from the network nodes that pass through the top-level signal splitter;
c) a first amplifier for producing amplified first signals from the signals passed by said first band pass filter;
d) a local oscillator for producing a local oscillator signal;
e) a mixer for mixing the amplified first signals and the local oscillator signal to produce signals at a second frequency;
f) a second amplifier for producing amplified second signals from the signals produced by said mixer; and
g) a second band pass filter for passing the amplified second signals to the network nodes at the second frequency through the top-level signal splitter.

17. The coaxial cable network of claim 15, wherein the top-level splitter is configured such that a path loss in top-level signal splitter is less than about 15 dB.

18. The coaxial cable network of claim 15, wherein the path loss in the coaxial cable network along a path that includes the top-level signal splitter is less than about 70 dB.

19. A coaxial cable network, comprising:
a) a network entry point for connection to pass signals to and from an external coax plant;
b) a top-level signal splitter, having a signal input port and a plurality of signal output ports;
c) an active node for receiving and sending the signals to and from the network entry point, to receive signals from coaxial cable network nodes through the top-level splitter, and to transmit repeated signals to the network nodes through the top-level splitter and to the network entry point; and d) a plurality of lower level signal splitters, each having an input connected to receive signals from a respective signal output port of the top-level signal splitter, and each having a plurality of signal output ports for connection to respective network nodes.

20. The coaxial cable network of claim 19, wherein said active node comprises:
   a) a low pass filter (LPF) to pass signals to and from said network entry point and to and from said top-level splitter;
   b) a band pass filter (BPF) to pass signals from the network entry point and to and from nodes in the coaxial cable network that pass through the top-level signal splitter;
   c) a receiver to receive signals from said BPF;
   d) a baseband processing unit to receive signals from said receiver, said baseband processing unit for demodulating the signals received signals from said receiver to produce data packets, for storing the data packets, and for retransmitting the data packets;
   e) a transmitter for transmitting to said BPF the retransmitted data packets from said baseband processing unit; and
   f) a switch for selectively directing signals from said BPF to said receiver and from said transmitter to said BPF.

21. The coaxial cable network of claim 20, wherein a bandwidth of the signals in the coaxial cable network is 8 GHz.

22. The coaxial cable network of claim 21, wherein a passband of said BPF is from about 2 GHz to about 10 GHz.

23. A method of configuring a coaxial cable network, comprising:
   a) providing a top-level signal splitter having an input port connected to receive a signal from a network entry point and having a plurality of output ports;
   b) providing a plurality of lower level signal splitters, each having an input port connected to receive a signal from a respective one of the plurality of the output ports of the top-level signal splitter, and each having a plurality of output ports; and
   c) configuring said coaxial cable network such that a path loss along a path that includes said top-level signal splitter is less than about 70 dB at signal frequencies above about 2 GHz.

24. The method of claim 23, wherein said configuring comprises using a top-level splitter having a path loss of less than 15 dB from any port to any other port of said top-level splitter.

25. The method of claim 23, wherein said configuring comprises using a top-level splitter and lower-level splitters, each having a path loss of less than 15 dB from any port to any other port.

26. The method of claim 23, wherein said configuring comprises providing an active node between the network entry point the input port of the top-level signal splitter.

27. The method of claim 26, wherein said providing an active node comprises providing an active node with frequency translation in different signal directions.

28. The method of claim 26, wherein said providing an active node comprises providing an active node having a digital repeater.

* * * * *